United States Patent [19]

Mills et al.

[11] Patent Number: 5,328,755

[45] Date of Patent: Jul. 12, 1994

[54] POLYMERIC FILM

[75] Inventors: Paul D. A. Mills, Darlington; Anton R. Olek, Guisborough, both of England; Junaid A. Siddioui, Richmond, Va.

[73] Assignee: Imperial Chemical Industries PLC, London, England

[21] Appl. No.: 883,872

[22] Filed: May 15, 1992

[30] Foreign Application Priority Data

May 16, 1991 [GB] United Kingdom ............ 9110590.8

[51] Int. Cl.$^5$ .......................... B32B 27/08; B32B 5/16
[52] U.S. Cl. .................................... 428/215; 428/220; 428/331; 428/325; 428/483; 428/480; 428/910
[58] Field of Search ............... 428/215, 220, 331, 325, 428/483, 480, 910, 349

[56] References Cited

U.S. PATENT DOCUMENTS 4,302,506 11/1981 Heberger ............................ 428/483
4,956,232 9/1990 Balloni et al. ...................... 428/516

FOREIGN PATENT DOCUMENTS 0035835 9/1981 European Pat. Off. ...... B32B 27/08
0491504 6/1992 European Pat. Off. ........ C08K 7/20
1372811 11/1974 United Kingdom ........ C08G 17/08

Primary Examiner—P. C. Sluby
Attorney, Agent, or Firm—Cushman, Darby & Cushman

[57] ABSTRACT

A polymeric film, particularly a polyester film, comprising an essentially unfilled primary layer substrate and a filled secondary layer exhibiting an improved combination of transparency and handling properties. The filler is a mixture of glass and silica particles. The glass particles have a volume distributed median particle diameter of 1.0 to 7.0 μm and are present in the secondary layer at a concentration of 50 to 1000 ppm, while the silica particles are present in the range 200 to 2000 ppm and have an average primary particle size of 0.01 to 0.09 μm. The film is suitable for use in a wide range of applications, particularly for information storage and display.

10 Claims, 1 Drawing Sheet

POLYMERIC FILM

This invention relates to a polymeric film, and in particular to a composite polymeric film.

It is known that polymeric films often have poor handling properties which may result in difficulties in winding the films into high quality reels and inefficient passage through processing, for example, slitting, equipment. Film handling properties can be improved by increasing the surface roughness of the film, suitably by the use of coatings, or alternatively by incorporating fillers, for example organic or inorganic particles into the film. A combination of coatings and fillers may be used to improve film handling properties. The problem with using coatings to improve film handleability is that they limit the range of uses to which the film may be applied because of the difficulty in applying additional coating layers which may be required, for example, to provide antistatic, adhesion promoting or release properties.

A wide range of fillers have been incorporated into films to improve handling properties, such as china clay, titanium dioxide, calcium carbonate, barium sulphate, silica, kaolin, zeeospheres and calcium phosphates. However, the presence of these fillers in the film results in a depreciation in the optical clarity and an increase in the haze, of the film. Combinations of fillers have been used, for example of different chemical species and/or different particle sizes, in order to optimise the required film properties. For example, British Patent No. GB-1372811 discloses the use of two inert additives in different size ranges, and U.S. Pat. No. 3,980,611 describes a film having coarse, medium and fine particles. U.S. Pat. No. 4,654,249 discloses a polymeric film comprising a combination of kaolinite and titanium oxide particles of a certain particle size range, present at a defined concentration.

Optical clarity and transparency are important criteria in a wide range of film applications, such as packaging, metallised films, reprographic films and films for general industrial use. There is a continuing need for films exhibiting high light transmittance, low haze and excellent handling properties. One way of reducing this problem is to coat a clear base film with a thin layer of material containing a filler, which can act as an anti-blocking agent, without reducing the overall transparency of the composite film to unacceptable levels. U.S. Pat. No. 4,533,509 describes polyester films of this type.

Polyester film composites comprising a layer of transparent homo-polyester and a layer of transparent co-polyester are described in GB Patent No. 1,465,973. European Patent No. 35835 describes a similar polyester film composite wherein the filler in the copolyester layer has an average particle size greater than the thickness of the layer. The filler particles protrude through the copolyester layer yielding a film with good anti-block properties and increasing the transparency and heat-sealability thereof. However, the aforementioned properties are only achieved at certain copolyester layer thickness/filler particle size ratios, such that any variation required in the copolyester layer thickness (for example for a different commercial application) necessitates a change in the filler particle size. This situation can result in a range of different fillers being required for different applications.

We have surprisingly overcome or substantially reduced one or more of the aforementioned problems.

Accordingly, the present invention provides a polymeric film comprising a primary layer or substrate of polymeric material having on at least one surface thereof a secondary layer of polymeric material comprising, based upon the weight of the polymer in the secondary layer, (a) 50 to 1000 ppm of glass particles having a volume distributed median particle diameter of 1.0 to 7.0 $\mu$m, and (b) 200 to 2000 ppm of silica particles having an average primary particle size of 0.01 to 0.09 $\mu$m.

The invention also provides a method of producing a polymeric film comprising forming a primary layer substrate of polymeric material having on at least one surface thereof a secondary layer of polymeric material comprising, based upon the weight of the polymer in the secondary layer, (a) 50 to 1000 ppm of glass particles having a volume distributed median particle diameter of 1.0 to 7.0 $\mu$m, and (b) 200 to 2000 ppm of silica particles having an average primary particle size of 0.01 to 0.09 $\mu$m.

The polymeric film is a self-supporting film, for example a self-supporting structure capable of independent existence in the absence of a supporting base.

The polymeric film primary layer or substrate according to the invention may be formed from any synthetic, film-forming polymeric material. Suitable thermoplastics materials include a homopolymer or copolymer of a 1-olefin, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, for example terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, for example ethylene glycol, 1,3-propanediol, 1,4-butanediol, neopentyl glycol and 1,4-cyclohexanedimethanol. A polyethylene terephthalate film substrate is particularly preferred, especially such a film which has been biaxially oriented by sequential stretching in two mutually perpendicular directions, typically at a temperature in the range 70° to 125°, and preferably heat set, typically at a temperature in the range 150° to 250°, for example as described in British patent 838708.

The polymeric film substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203, particularly suitable materials being those sold by ICI PLC under the Registered Trade Mark STABAR. The substrate may comprise a poly(arylene sulphide), particularly poly-p-phenylene sulphide or copolymers thereof. Blends of these polymers may also be employed.

Suitable thermoset resin materials include addition—polymerisation resins—such as acrylics, vinyls, bis-maleimides and unsaturated polyesters, formaldehyde condensate resins—such as condensates with urea, melamine or phenols, cyanate resins, functionalised polyesters, polyamides or polyimides.

The polymeric film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics material as a flat extrudate which is subsequently stretched first in one direction and then in the other mutually perpendicular direction. Generally, it is preferred to stretch firstly in the longitudinal direction, i.e. the forward direction through the film stretching machine, and then in the transverse direction. A stretched film may be, and preferably is, dimensionally stabilised by heat-setting under dimensional restraint at a temperature above the glass transition temperature thereof.

The secondary layer of a polymeric film according to the invention comprises any one or more of the polymeric materials hereinbefore described as being suitable for use in forming the polymeric primary layer or substrate. In a preferred embodiment of the invention the substrate and secondary layer comprise the same polymeric material, more preferably a polyester, and particularly polyethylene terephthalate.

In an alternative embodiment of the invention, the secondary layer comprises a heat-sealable material which is capable of forming a heat-seal bond to itself or to the substrate, or preferably to both, by heating to soften the polymeric heat-sealable material and applying pressure without softening or melting the polymeric material of the substrate layer. A heat-sealable material suitably comprises a polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory heat-sealable properties are those of ethylene terephthalate and ethylene isophthalate, especially in the molar ratios of from 50 to 90 mole % ethylene terephthalate and correspondingly from 50 to 10 mole % ethylene isophthalate. Preferred copolyesters comprise from 65 to 85 mole % ethylene terephthalate and from 35 to 15 mole % ethylene isophthalate, and especially a copolyester of about 82 mole % ethylene terephthalate and about 18 mole % ethylene isophthalate.

Formation of the secondary layer on the substrate layer may be effected by conventional techniques-for example, by casting the polymer onto a preformed substrate layer. Conveniently, however, formation of a composite sheet (substrate and secondary layer) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a composite sheet. A coextruded sheet is stretched to effect molecular orientation of the substrate, and preferably also of the secondary layer. In addition, the composite sheet is preferably heat-set.

Secondary layers may be disposed on one or both sides of the substrate layer. The film composites may have a total thickness in the range 10 to 500 $\mu$m, preferably 50 to 175 $\mu$m and each secondary layer(s) preferably constitute from 1 to 25% of the total composite thickness. The secondary layers preferably have a thickness of up to 20 $\mu$m, more preferably from 0.5 to 10 $\mu$m, and especially from 0.5 to 5 $\mu$m.

The glass particles suitable for use in the secondary layer of a polymeric film according to the present invention are preferably solid glass beads, preferably being of substantially circular cross-section irrespective of the selected viewing point. Desirably, an individual glass particle exhibits an aspect ratio $d_1:d_2$ (where $d_1$ and $d_2$, respectively, are the maximum and minimum dimensions of the particle) in a range of from 1:1 to 1:0.5, preferably from 1:1 to 1:0.8, and especially from 1:1 to 1:0.9.

The glass particles for use in the present invention are not limited by their chemical composition, but the glass particles preferably comprise crown glass and/or borosilicate glass in order to optimise the optical clarity of the resultant filled film. The glass particles may have a relatively smooth or, alternatively, an etched or chemically treated surface. Etching of the surface of the glass particles can be suitably achieved by contacting the particles with nitric acid for a sufficient period of time to obtain the required degree of etching. Chemical treating of the surface of the glass particles can involve the adsorption or reaction of suitable complex agents, for example those based on silane chemistry.

The volume distributed median particle diameter (equivalent spherical diameter corresponding to 50% of the volume of all the particles, read on the cumulative distribution curve relating volume % to the diameter of the particles—often referred to as the "D(v,0.5)" value) of the glass particles incorporated into a polymeric film according to the invention is in a range from 1.0 to 7.0 $\mu$m, preferably 2.0 to 4.5 $\mu$m, and especially 2.5 to 4.0 $\mu$m. The size distribution of the glass particles is also an important parameter, for example the presence of excessively large particles can result in the film exhibiting unsightly 'speckle', for example where the presence of individual filler particles in the film can be discerned with the naked eye. The presence of an excessive number of small particles in the film can result in an unacceptable increase in haze. Desirably, therefore, the actual particle size of 99.9% by volume of the particles should not exceed 20 $\mu$m, preferably 15 $\mu$m, and particularly not exceed 10 $\mu$m. Preferably 90% of the glass particles are within the range of the mean particle size ±3.0 $\mu$m, and particularly ±2.5 $\mu$m.

In order to obtain the advantageous properties of the present invention the concentration of glass particles present in the secondary layer should be in the range 50 to 1000 ppm, preferably 100 to 800 ppm, particularly 150 to 600 ppm and especially 200 to 400 ppm based upon the weight of the polymer in the secondary layer.

The glass particles for use in accordance with the invention preferably comprise a non-agglomerating additive, the primary particle structure of which remains inviolate during compounding with the film-forming polymer, and film formation therefrom, whereby the discrete particle form of the glass is retained in the finished film.

The individual or primary silica particles suitable for use in the secondary layer of a polymeric film according to the present invention are preferably of substantially circular cross-section irrespective of the selected viewing point. Desirably, a typical primary silica particle exhibits an aspect ratio $d_1:d_2$ (where $d_1$ and $d_2$, respectively, are the maximum and minimum dimensions of the particle) in a range of from 1:1 to 1:0.5, and preferably from 1:1 to 1:0.8.

The average particle size (by which is meant the number average particle diameter) of the primary silica particles incorporated into a polymeric film according to the invention is in a range from 0.01 to 0.09 μm, preferably 0.02 to 0.08 μm, and especially 0.03 to 0.06 μm.

In a preferred embodiment of the invention, the primary silica particles aggregate to form clusters or agglomerates comprising a plurality of primary silica particles. The aggregation process of the primary silica particles may take place during the actual synthesis of the silica and/or during the polymer and film making process. It is preferred that the average particle size of the silica agglomerates in the final film product is in a range from 0.05 to 0.5 μm, preferably 0.2 to 0.4 μm, and especially 0.25 to 0.35 μm.

In order to obtain the advantageous properties of the present invention the concentration of silica particles present in the final polymeric film should be in the range 200 to 2000 ppm, preferably 800 to 1600 ppm, and especially 1000 to 1400 ppm based upon the weight of the polymer in the secondary layer.

The silica particles for use in films according to the invention preferably comprise a type of silica known commercially as fumed or pyrogenic silica. Fumed silica can be formed by reacting silicone tetrachloride in an oxygen flame to form single, spherical particles of silicon dioxide. The aforementioned particles grow through collision and coalescence to form larger, i.e. primary particles. As the particles cool and begin to freeze, but continue to collide, they stick but do not coalesce, forming solid aggregates which in turn continue to collide to form clusters or agglomerates. The average particle size values for primary silica particles given above refer to the average particle size of single cooled spherical silica particles.

The silica particles for use in accordance with the invention preferably agglomerate further, to a limited degree, into larger particles when added to polymeric materials or the reactants for their formation.

Polymeric films according to the invention preferably comprise a secondary layer comprising 100 to 800 ppm of glass particles and 800 to 1600 ppm of silica particles, and in particular comprise 150 to 600 ppm of glass particles and 1000 to 1400 ppm of silica particles. In addition, the glass particles in the secondary layer preferably exhibit a volume distributed median particle diameter of 2.0 to 4.5 μm, and the silica particles have an average particle size of 0.02 to 0.08 μm, particularly 2.5 to 4.0 μm for the glass and 0.03 to 0.06 μm for the silica particles.

The polymeric film of the present invention is desirably optically clear, preferably having a wide angle haze, for a 75 μm thick film, of <1.5%, more preferably <1.2%, especially <1.0%, and particularly <0.8%, being measured according to the standard ASTM D 1003-61.

The secondary layer surface of a polymeric film according to the invention preferably exhibits a static coefficient of friction of <0.8, preferably <0.6, and particularly <0.5.

Particle sizes of the glass and silica particles may be measured by electron microscope, coulter counter, sedimentation analysis and static or dynamic light scattering. Techniques based on laser light diffraction are preferred for determining the particle size of glass particles. The median particle size may be determined by plotting a cumulative distribution curve representing the percentage of particle volume below chosen particle sizes and measuring the 50th percentile.

The glass and silica particles may be added to the polymeric secondary layer or polymeric secondary layer-forming material at any point in the film manufacturing process prior to the extrusion of the polymer. For composite films comprising a polyester secondary layer, it is preferred to incorporate the glass and silica particles as a glycol dispersion during the esterification reaction stage of the polyester synthesis.

The layers of a film according to the invention may conveniently contain any of the additives conventionally employed in the manufacture of polymeric films. Thus, agents such as dyes, pigments, lubricants, antioxidants, anti-blocking agents, surface active agents, slip aids, gloss-improvers, prodegradants, ultra-violet light stabilisers, viscosity modifiers and dispersion stabilisers may be incorporated in the substrate and/or secondary layer(s), as appropriate. The additives will preferably not increase the wide angle haze of the polymeric film up to or above the aforementioned values. In particular, it is preferred that the substrate of a polymeric film according to the invention contains little or no filler, in order to yield a film of maximum optical properties. However, the substrate may contain relatively small quantities of filler material, preferably less than 500 ppm, more preferably less than 250 ppm, and particularly less than 125 ppm, for example due to the normal practice of using reclaimed film in the film manufacturing process.

A polymeric film according to the invention may be coated on one or both surfaces with one or more additional coating, ink, lacquer and/or metal layers, for example to form a laminate or composite which exhibits improved properties, such as antistatic, adhesion promoting or release, compared with the component materials. A preferred antistatic coating layer comprises a polychlorohydrin ether of an ethoxylated hydroxyamine and a polyglycol diamine, particularly of the type disclosed in European Patent No. EP-190499.

Prior to the deposition of a coating medium onto the substrate and/or secondary layer, the exposed surface thereof may, if desired, be subjected to a chemical or physical surface-modifying treatment to improve the bond between that surface and the subsequently applied coating layer. A preferred treatment is corona discharge, which may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface. Alternatively, the substrate may be pretreated with an agent known in the art to have a solvent or swelling action on the polymer layer. Examples of such agents which are particularly suitable for the treatment of a polyester film surface include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The coating medium may be applied to an already oriented film substrate, but application of the coating medium is preferably effected before or during the stretching operation.

In particular, it is preferred that the coating medium should be applied to the film substrate and/or secondary layer between the two stages (longitudinal and transverse) of a thermoplastics film biaxial stretching operation. Such a sequence of stretching and coating is especially preferred for the production of a coated polymeric film comprising a linear polyester film substrate and/or polyester secondary layer, which is preferably firstly stretched in the longitudinal direction over a series of rotating rollers, coated with the coating layer, and then stretched transversely in a stenter oven, preferably followed by heat setting.

Polymeric films according to the invention are suitable for use in a wide range of film applications, such as packaging, e.g. carton windows, metallised films, reprographic films and films for general industrial use. Polymeric films described herein are particularly suitable for information storage and display, such as montage, masking, stencil, overhead projection, membrane touch switch, microfilm and printing, such as thermal wax transfer printing. Films according to the invention may exhibit anti-Newton ring properties which is an important advantage in certain reprographic applications.

In this specification the following test methods have been used to determine certain properties of the polymeric film:

The static coefficient of friction of the secondary layer surface of the polymeric film was measured against itself by an inclined plane method based on ASTM test D 4518-87, using a Model IPST (Specialist Engineering, Welwyn, UK).

The dynamic coefficient of friction of the secondary layer surface of the polymeric film was measured against itself by the procedure of ASTM test D 1894-87, using an Instron Universal Testing Machine (Instron, UK).

Wide angle haze was determined as the percentage of transmitted light which deviates from the normal to the surface of the film by an average amount greater than 2.5° of arc during passage through the film, essentially according to ASTM test D 1003-61, using a Hazegard XL211 Hazemeter (BYK Gardner, U.S.).

The handling and winding properties of the film were evaluated on a slitting machine. Reels of length between 1000 m and 3000 m, and width between 500 mm and 2000 mm were slit at speeds between 50 and 400 meters per minute. The resultant slit reels were assessed for their physical appearance.

The invention is illustrated by reference to the accompanying drawings in which.

Figure 1:
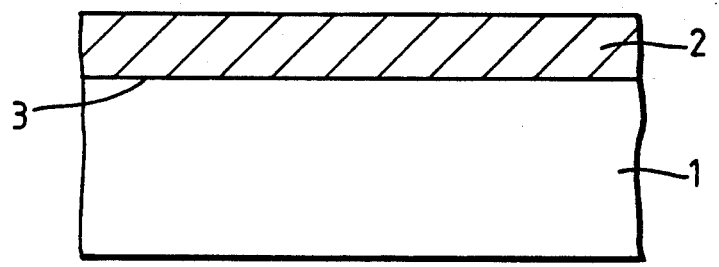
FIG. 1 is a schematic sectional elevation, not to scale, of a polymeric film having a secondary layer adhered directly to a first surface of a primary layer or substrate.

Referring to FIG. 1 of the drawings, the film comprises a polymer substrate layer or (1) having a secondary layer (2) bonded to one surface (3) thereof.

Figure 2:
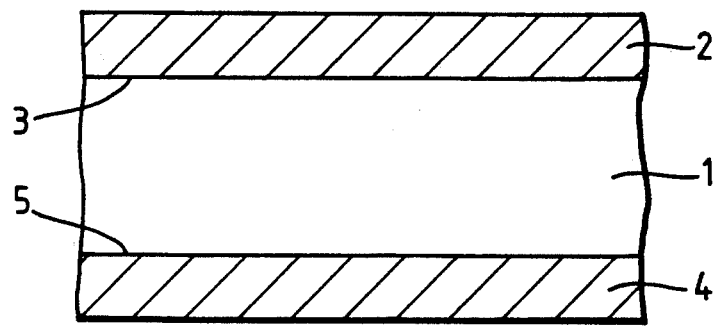
FIG. 2 is a similar schematic elevation of a polymeric film with an additional secondary layer adhered to the second surface of the substrate.

The film of FIG. 2 further comprises an additional secondary layer (4), bonded to the second surface (5) of the substrate (1).

The invention is further illustrated by reference to the following Examples.

EXAMPLE 1

Film composites comprising unfilled polyethylene terephthalate as the primary layer or substrate and two secondary layers comprising polyethylene terephthalate containing approximately 300 ppm of glass beads having a volume median distributed diameter of 2.7 $\mu$m (Spheriglass E250P4CL, supplied by Potters Industries Inc., USA), measured using a Malvern Instruments Mastersizer MS 15 Particle Sizer after dispersing the glass beads in a high shear (Chemcoll) mixer, and approximately 1200 ppm of silica particles having an average primary particle size of 0.04 $\mu$m (Aerosil OX50, supplied by Degussa) were produced by a process of single channel coextrusion wherein steams of unfilled and filled polyethylene terephthalate supplied by separate extruders were united in a tube leading to the manifold of an extrusion die and were extruded simultaneously through the die under conditions of streamline flow and without intermixing. The film composite emerging from the extrusion die was quenched immediately upon a water-cooled rotating metal drum having a polished surface and stretched to 3.3 times its original dimension in the direction of extrusion at a temperature of about 85° C. The longitudinally stretched film was then stretched transversely in a stenter oven to 3.5 times its original dimension at a temperature of about 120° C. The film composite was finally heat set under dimensional restraint in a stenter oven at a temperature of about 225° C.

The resulting film composite consisted of a biaxially oriented and heat-set unfilled polyethylene terephthalate primary layer or substrate and two filled polyethylene terephthalate secondary layers. Final film thickness was 75 $\mu$m, each secondary layer being about 4 $\mu$m thick. The film was subjected to the test methods described above and exhibited the following characteristics:

1) The static coefficient of friction of the secondary layer=0.46
2) The dynamic coefficient of friction of the secondary layer=0.36
3) Haze=1.3%;

The slit reels produced in the winding test were of excellent physical appearance. The slit reels exhibited no sign of "telescoping" or "wander", i.e. the ends of the reels were flat and fully normal to the cylindrical axis of the reel. The slit reels also showed no sign of pimple-like defects either on the surface or inside of the reels. The slit reels also showed no sign of a high edge at or around one or both of the slit reel ends.

EXAMPLE 2

This is a comparative example not according to the invention. The procedure of Example 1 was repeated except that each of the two secondary layers contained 1550 ppm of china clay of median particle size 0.8 $\mu$m. The film was subjected to the test methods described above and exhibited the following characteristics:

1) The static coefficient of friction of the secondary layer=0.37
2) The dynamic coefficient of friction of the secondary layer=0.40

3) Haze=3.7%;

The slit reels produced in the winding test were also of excellent physical appearance with no sign of "telescoping" or "wander", pimple-like defects or a high edge at the ends of a slit reel. However, these winding properties could only be achieved with film having an unacceptable haze value of 3.7%.

EXAMPLE 3

This is a comparative example not according to the invention. The procedure of Example 1 was repeated except that each of the two secondary layers contained 800 ppm of silica particles and no glass beads. The film was subjected to the test methods described above and exhibited acceptable haze but unacceptable handling properties having a static coefficient of friction value greater than 1.1.

EXAMPLE 4

This is a comparative example not according to the invention. The procedure of Example 1 was repeated except that each of the two secondary layers contained 300 ppm of glass beads and 100 ppm of silica particles. The film was subjected to the test methods described above and exhibited acceptable haze but unacceptable handling properties having a static coefficient of friction value greater than 1.1.

EXAMPLE 5

This is a comparative example not according to the example. The procedure of Example 1 was repeated except that each of the two secondary layers contained 1100 ppm of glass beads and 1200 ppm of silica particles. The film was subjected to the test methods described above and exhibited an acceptable static coefficient of friction value but an unacceptable haze value of greater than 1.5%. The above results illustrate the improved properties of polymeric films according to the present invention.

We claim:

1. A polymeric film consisting essentially of an unfilled primary layer of a synthetic film-forming polymeric material having on at least one surface thereof a secondary layer consisting essentially of a synthetic film-forming polymeric material including, based upon the weight of the polymer in the secondary layer, (a) 50 to 1000 ppm of glass particles having a volume distributed median particle diameter of 1.0 to 7.0 μm, and (b) 200 to 2000 ppm of silica particles having an average primary particle size of 0.01 to 0.09 μm.

2. A film according to claim 1 wherein the secondary layer includes 100 to 800 ppm of glass particles, based upon the weight of the polymeric material of the secondary layer.

3. A film according to claim 1 wherein the secondary layer includes 800 to 1600 ppm of silica particles, based upon the weight of the polymeric material of the secondary layer.

4. A film according to claim 1 wherein the glass particles have a volume distributed median particle diameter of 2.0 to 4.5 μm.

5. A film according to claim 1 wherein the silica particles have an average primary particle size of 0.02 to 0.08 μm.

6. A film according to claim 1 wherein the silica particles are present in the secondary layer in the form of agglomerates having an average particle size of 0.2 to 0.4 μm.

7. A film according to claim 1 wherein the secondary layer constitutes from 1 to 25% of the total film thickness.

8. A film according to claim 1 wherein the wide angle haze of a film of 75 μm thickness is less than 1.5%.

9. A film according to claim 1 wherein both the primary layer and the secondary layer are biaxially oriented polyethylene terephthalate.

10. A method of producing a polymeric film consisting essentially of forming a primary layer of unfilled synthetic film-forming polymeric material having on at least one surface thereof a secondary layer of polymeric material including, based upon the weight of the polymer in the secondary layer, (a) 50 to 1000 ppm of glass particles having a volume distributed median particle diameter of 1.0 to 7.0 μm, and (b) 200 to 2000 ppm of silica particles having an average primary particle size of 0.01 to 0.09 μm.

* * * * *